Oct. 13, 1953  E. VAN HAAFTEN  2,655,039
MAINSPRING DYNAMOMETER
Filed Sept. 8, 1949  3 Sheets-Sheet 1
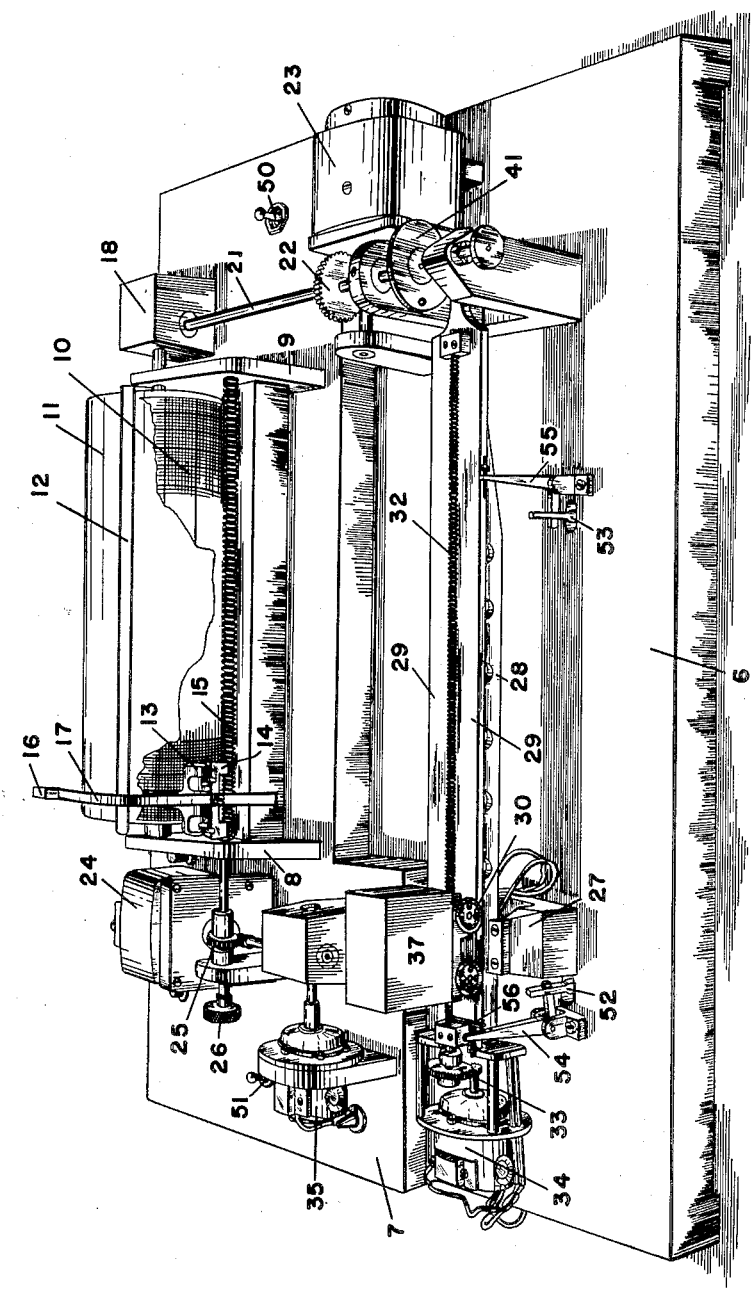
FIG. I
INVENTOR.
EGBERT VAN HAAFTEN
BY
ATTORNEY

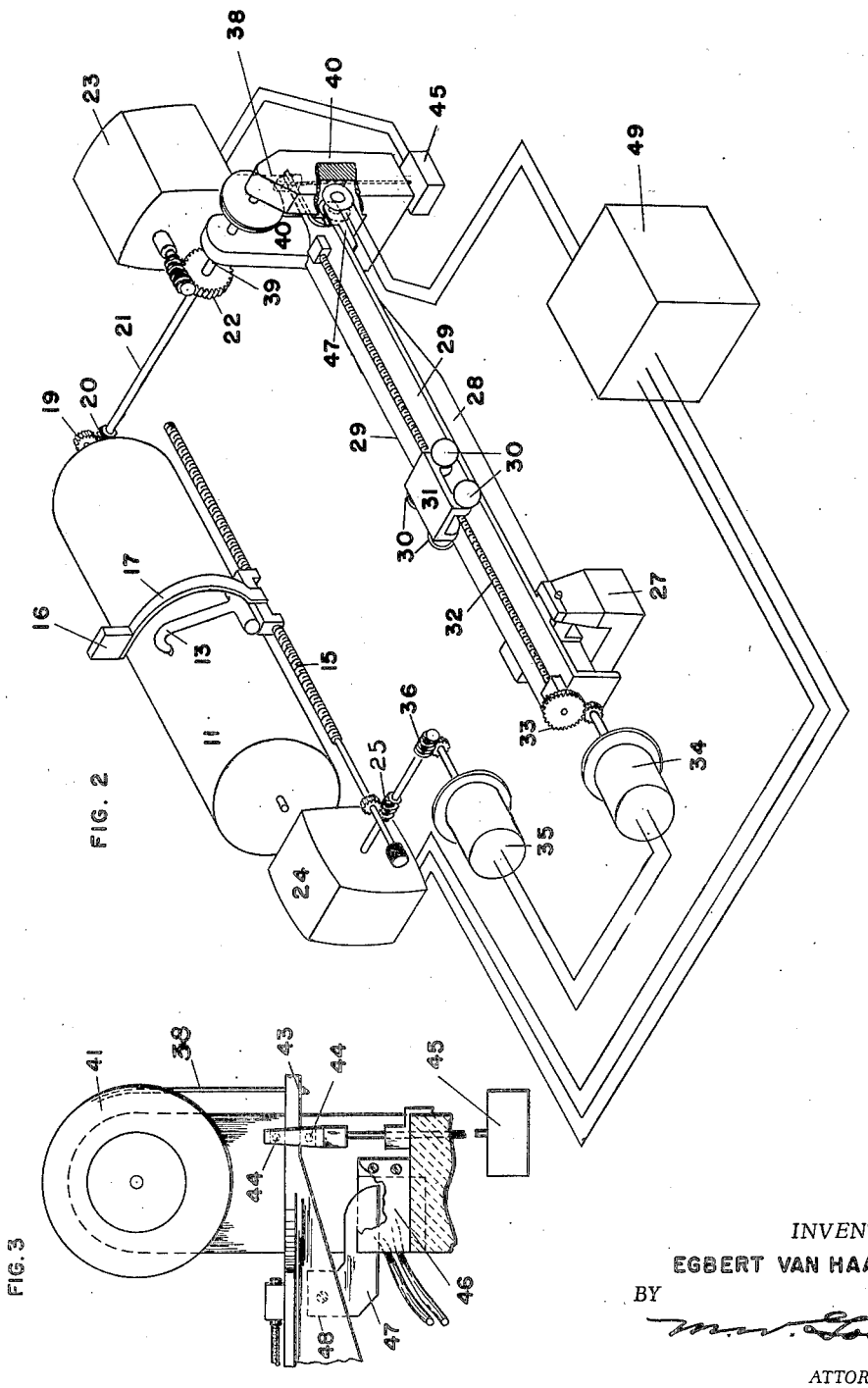

Oct. 13, 1953  E. VAN HAAFTEN  2,655,039
MAINSPRING DYNAMOMETER
Filed Sept. 8, 1949  3 Sheets-Sheet 3

INVENTOR.
EGBERT VAN HAAFTEN
BY
ATTORNEY

Patented Oct. 13, 1953

2,655,039

UNITED STATES PATENT OFFICE 2,655,039

MAINSPRING DYNAMOMETER

Egbert Van Haaften, Lancaster Township, Lancaster County, Pa., assignor to Hamilton Watch Company, Lancaster, Pa.

Application September 8, 1949, Serial No. 114,601

7 Claims. (Cl. 73—161)

This invention relates to a mainspring dynamometer used for producing graphic information concerning the torque of watch mainsprings at all periods of their winding.

The object of the present invention is to provide a machine which will produce a permanent record so that the torque of a mainspring may be instantly determined at any point of wind in the mainspring.

A further object of the present invention is to provide a machine for measuring the torque of mainsprings which is automatic in operation and which will produce a permanent record of the torque during both the winding and unwinding operation.

A further object of the present invention is to provide a machine which will automatically record the torque of a watch mainspring during the winding and unwinding period and one which may be operated by anyone not having particular skill in the art.

A further object of the present invention is to provide a pivoted lever with means for transferring the torque of a watch mainspring to one end of said lever and balancing said torque with a movable weight to provide a direct measure of said torque.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawings in which:

Figure 1 is a perspective view showing the complete invention with the exception of the "Electrolink."

Figure 2 is a diagrammatic view of the entire device, omitting the relay wiring which is part of the "Electrolink."

Figure 3 is a detail view of the controlling shield which operates the "Electrolink" together with the reversing switch carried at the end of the beam.

Figure 4:
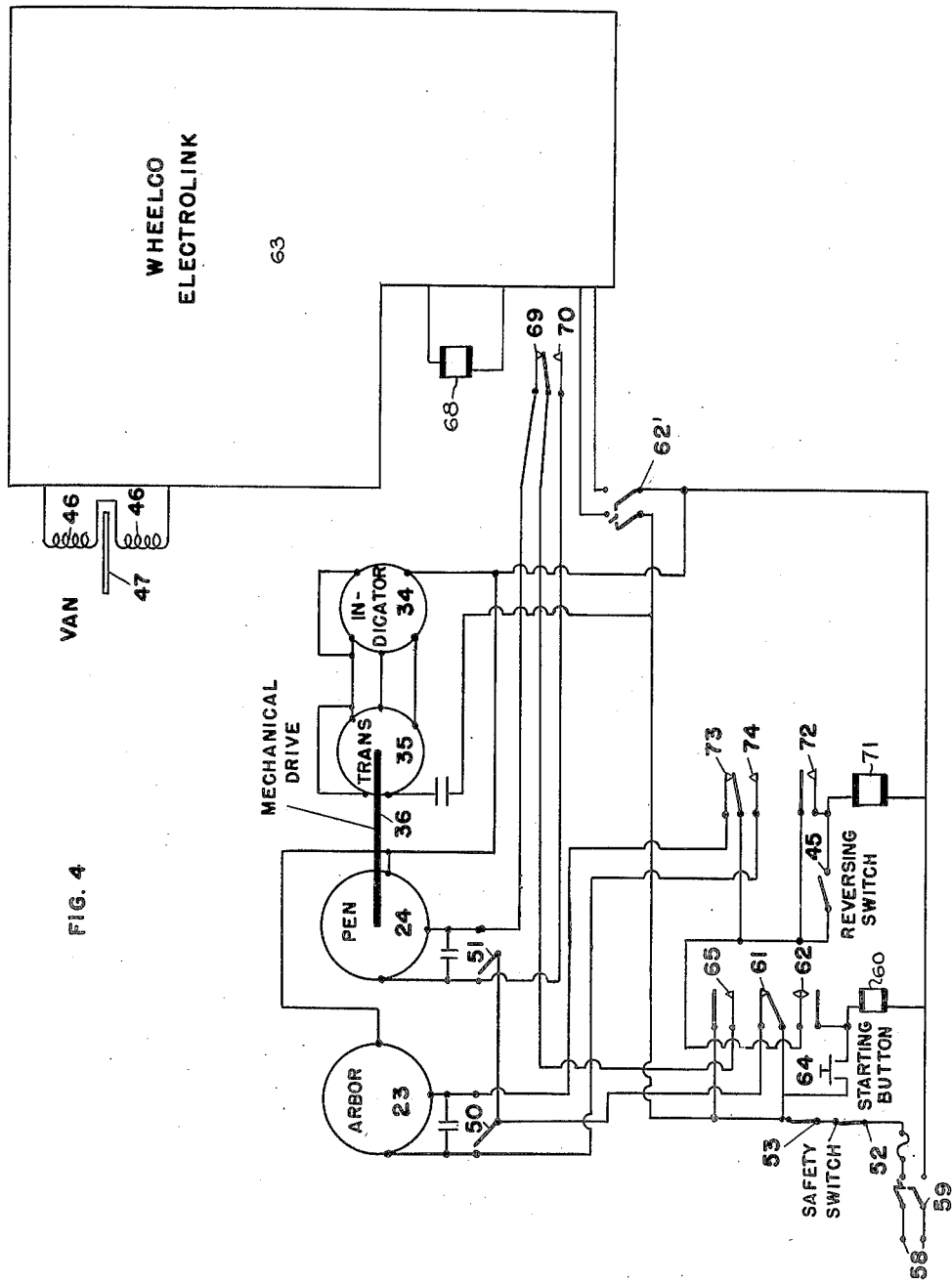
Figure 4 is a wiring diagram of the entire device.

Referring to Figure 1 a base 6 is formed with a raised section 7 supporting the standards 8 and 9 between which is mounted a drum 10.

The drum 10 is adapted to receive a piece of graph paper 11 which is held in place by a steel strip 12. A pen 13 is mounted on a traveler 14 which rides on a threaded rod 15. A weight 16 carried on a curved arm 17 is attached to the traveler and insures contact of the pen with the paper at all times. The standard 18 supports gears 19 and 20 and drives the drum 10 by means of the shaft 21 and worm drive 22 from the synchronous motor 23. A second motor 24 which is of the Bodine reversible type turning up 1200 R. P. M. drives the shaft 15 through a worm drive 25. A knurled wheel 26 is attached to the shaft 15 so that it may be rotated manually to position in the pen. Mounted on the lower part of the base 6 is a standard 27 serving as a fulcrum for a beam 28 which has tracks 29 for wheels 30 of a weight carrying car 31. This car is mounted directly over a threaded rod 32 which is carried centrally of the lever 28 and is driven in either direction by gears 33 connected to a selsyn indicator 34. The selsyn indicator 34 is driven by the selsyn transmitter 35 which is driven mechanically through the worm drive 36 by the reversing motor 24 so that the threaded rods 15 and 32 are simultaneously turned.

The beam 28 which is fulcrumed on the standard 27 carries the selsyn indicator 34, the weight carrying car 31 which has a detachable weight 37 and has attached thereto a string 38 which transmits the torque from the mainspring to be tested.

The motor 23 drives the drum 10 through the worm drive 22 and simultaneously drives the shaft 39 which is journalled in the standard 40.

The mainspring barrel is mounted in a specially designed disc 41 which provides means for holding the barrel stationary so that the barrel arbor can be rotated slowly by the shaft 39, thus winding or unwinding the mainspring contained within the barrel. Carried on the periphery of the disc is the cord 38 which is attached to the free end of the beam at 43. Thus torque of the mainspring is transmitted through the barrel, the mounting disc and the string to the free end of the beam and provides a lifting force which is counterbalanced by the shifting weight and held within limits by stop 44 which is itself movable to operate a reversing switch 45.

Mounted between the standards 40 are a pair of magnetic coils 46 which are arranged opposite to and spaced slightly from each other with a resultant magnetic flow between the two coils. An aluminum shield 47 is secured to the beam at 48 and by the rise and fall of the beam varies the reluctance between the two coils. This variation is picked up by a mechanism known as as "Wheelco Electrolink" 49 described in Patent 2,228,163 which through means of an electronic circuit controls the driving motor 24 which in turn drives the worm gears 25 and 36 actuating the lead screw 15 and the selsyn transmitter 35. Movement of the selsyn transmitter 35 is closely followed by the selsyn indicator 34 which drives the lead screw 32 of the beam in the desired direction.

In operation a mainspring and its barrel is secured in the disc 41 and mounted between the standards 40 so that the shaft 39 is connected to the winding arbor of the spring. Manually operated switches 50 and 51 are provided and the motor 23 is operated so that the slack is taken out of the spring and the cord 38 is taut.

An ordinary piece of graph paper 11 is then mounted on the drum 10 and held in place by the steel bar 12. The revolutions of the drum are calibrated so that one complete wind of the mainspring is translated into a unit distance along the circumference of the drum which represents the abcissa of the graph. The ordinate of the graph is represented by the travel of the pen longitudinally of the drum. The manual control switch 51 is operated to move the car 31 and its weight 37 along the beam until the beam is in balance, whereupon the pen is initially positioned on the graph through the hand operated knob 26 and the apparatus is in position to start the test.

The main switch is closed which starts the motor 23 and 24 and simultaneously energizes the "Electrolink" 49. The operation of the motor 23 revolves the shaft 39 and 21 winding the arbor of the mainspring and rotating the drum at a proportional rate. This winding of the arbor causes an upward pull on the end of the beam, transmitting the torque of the mainspring to the beam which changes the position of the shield 47 between the magnetic coils 46, varying the reluctance between those magnetic coils, which variation is transmitted through the electronic circuit to the motor 24. The operation of the motor 24 moves the car 31 along the lead screw 32 and simultaneously moves the pen along its lead screw 15 and in contact with the rotating graph. At the moment when the weight of the car overcomes the pull of the main spring the end of the beam is depressed causing the shield 47 to again vary the reluctance between the magnetic coils 46 and through the electronic circuit reverse the direction of the motor 24. This procedure is continually carried out, thus providing a hunting system in which the torque of the mainspring is constantly balanced by the movement of the car 31 until a complete winding of the mainspring is accomplished.

Upon completion of the wind of the mainspring a steady upward pull is transmitted to the end of the beam so that the upper stop 44 is contacted with sufficient force to operate the microswitch 45 which reverses the motor 23 whereupon the process is again repeated through an unwinding operation, thus providing a graph which shows the torque of the mainspring at any point of wind both during the winding and unwinding operation.

Safety switches 52 and 53 are operated through pivoted levers 54 and 55 respectively which are located in the path of travel of an arm 56 which is attached to the car 31. The switch 52 is used as a stop switch at the completion of the operation, while the switch 53 serves only as an emergency safety switch to prevent overrunning of the car on the beam.

Referring particularly to Figure 4 a source of current 58 passes through a main switch 59 through the closed safety switches 52 and 53 and the contact 61 of the relay 60 to the center pole of the manually operated switches 50 and 51. This provides means for manually controlling both the arbor winding motor and the lead screw operating motors. After the initial positioning of the mechanism, switch 62' is closed throwing current into the "Electrolink" mechanism which is here designated generally as 63. This "Electrolink" mechanism is a purchased article and while a very important part of this dynamometer, it forms no part of the invention and will be referred to generally rather than specifically. The closing of the switch 62' allows the electronic unit to warm up and after a minute's warming period the starting button 64 is pressed, which operates the relay 60 throwing current from the contact 61 to the contact 62 and closing the contact 65. Operation of the relay 60 breaks the contact to the manually controlling switches 50 and 51, thus preventing their accidental operation during the test.

The shield 47 by varying the reluctance between the coils 46 varies the current on the grid of the "Electrolink." This variation in the grid is passed to the plate and through the electronic circuit provided by the "Electrolink" operates the relay 68 to repeatedly energize the contacts 69 and 70, thus reversing the motor 24. Upon the completion of the winding operation the reversing switch 45 is closed operating the relay 71 which closes the contact 72 maintaining a supply of current to the relay and shutting out the microreversing switch 45. Contact 73 is simultaneously broken and contact 74 made, thus reversing the motor 23 and starting the unwinding operation. During the unwinding operation the shield 47 will operate the "Electrolink" circuit in a manner similar to that of the winding operation until the arm 56 carried by the car 31 breaks the circuit by opening the switch 52 at which point the relays become deenergized and the circuit assumes its original condition.

What is claimed is:

1. A dynamometer for measuring the torque of watch mainsprings during the winding and unwinding operation, comprising a pivoted beam, means for transferring the torque in said mainspring to a force applied at one end of said beam, means for winding said spring and thereby changing said torque movable weight means on said beam for counterbalancing said applied force during the changing period and means operatively connected with said weight means for constantly recording said change in torque.

2. A dynamometer for measuring the torque of watch mainsprings during the winding and unwinding operation, comprising a pivoted beam, means for transferring the torque from said mainspring to a force applied at the end of said pivoted beam, means for winding the mainspring to constantly vary the force delivered to said beam and an automatically movable weight adapted to advance along said beam to counterbalance the torque from said mainspring and means for constantly recording said variation.

3. A dynamometer for measuring the torque of a watch mainspring during the winding and unwinding operation, comprising a beam pivotally mounted in jewel bearings, means for winding a watch mainspring, means for transferring the torque of said wound mainspring to a force applied to the free end of the beam to produce an upward moment on said beam, a movable weight carried on said beam, means controlled by the movement of the end of said beam for moving said weight to counterbalance the force resulting from said torque at all times during the winding and unwinding operation and means for recording the movement of said weight.

4. A dynamometer for measuring the torque of watch mainsprings during the winding and unwinding operation, comprising a beam pivotally mounted at one end in jewel bearings, means for mounting a spring to be torque tested adjacent the free end of said beam, a recording drum mounted for rotation, means for winding said spring and simultaneously rotating said drum proportionately to the winding of said spring, means for transferring the torque in said spring to the free end of said beam, means for counterbalancing said torque movably mounted on said beam, a recording pen movable longitudinally of said rotating drum, means responsive to the movement of the free end of said beam for simultaneously controlling the movements of said counterbalancing means and said pen operating means.

5. A dynamometer for measuring the torque of watch mainsprings throughout a complete winding and unwinding operation, comprising a base, a beam pivotally mounted adjacent one end in jewel bearings, a spring holder, means for mounting said spring holder adjacent the free end of said beam means for transferring the torque set up in said spring to a force applied to one end of said beam, a recording drum, means for supporting a sheet of graph paper on said drum, an electric motor simultaneously winding said spring and proportionally turning said recording drum, a lead screw carried by said beam and longitudinally thereof, a second lead screw carried adjacent to said recording drum, a motor for driving said second lead screw, a selsyn transmitter driven by said lead screw motor, a selsyn indicator carried on said beam adjacent said pivotal point for transferring the rotation of said selsyn transmitter to the lead screw of said beam whereby the operation of the two lead screws is simultaneous, a weight mounted on said beam and movable longitudinally thereof by said lead screw, a recording pen mounted on and movable by said second lead screw, said recording pen contacting the graph paper on said recording drum, means carried by the free end of said beam to control the movement of said lead screw motor, said controlling means moving said movable weight on said beam to counterbalance the force resulting from the torque of said spring at all times during the winding and unwinding operation, the recording pen moving simultaneously with said weight recording the longitudinal motion of said weight against the winding of said spring.

6. A dynamometer for measuring the torque of watch mainsprings throughout a complete winding and unwinding operation, comprising a base, a beam formed with a longitudinal track pivotally mounted adjacent one end on said base, a yoke standard mounted on said base and substantially enclosing the end of said beam farthest from the pivotal point, means for mounting a spring to be torque tested directly above the free end of said beam, means connecting the outer coil of said spring to the yoke end of said beam, a recording drum journalled in standards carried by said base, a synchronous electric motor mounted on said base, means connecting said motor with the arbor of said watch spring and the axis of said drum, whereby the watch spring arbor and the drum are rotated proportionally, a beam lead screw carried longitudinally and forming part of said beam, a pen lead screw carried by the drum standards mounted parallel to the longitudinal axis of said drum, a movable weight carried on said beam and actuated by said beam lead screw, a recording pen mounted on said pen lead screw and in contact with said recording drum, an electric motor for operating the pen lead screw, a selsyn transmitter geared to said pen electric motor and turning simultaneously with the pen lead screw, a selsyn transmitter carried by the beam adjacent the pivotal point and adapted to operate the beam lead screw, whereby the movement of the pen lead screw and the beam lead screw are synchronous, a pair of magnetic coils carried by the yoke standard and beneath the end of the beam, a vane carried by the end of said beam and adapted to be interposed between two coils by the up and down movement of the yoke end of said beam to vary the magnetic flux between said coils, an electronic circuit susceptible to said variation connected to said pen lead screw motor to control the operation of said motor, whereby the up and down movements of the yoke end of said beam are transferred by the electronic circuit to the running and reversal of said pen lead screw motor, whereby the increasing or decreasing torque on the spring being transferred to the beam will be counterbalanced by movement of the weight along the beam, which will be recorded by the pen on the recording drum, means for reversing said synchronous motor when the spring is fully wound to start an unwinding operation and means for stopping said motors at the end of the unwinding operation.

7. An apparatus according to claim 6 provided with safety switches positioned in the path of movement of the movable weight adjacent the extreme ends of such path and adapted to be actuated by the movable weight as it approaches the limit of its movement.

EGBERT VAN HAAFTEN.

References Cited in the file of this patent

UNITED STATES PATENTS

| Number | Name | Date |
|---|---|---|
| 2,113,550 | Nieman | Apr. 5, 1938 |
| 2,182,519 | Handy et al. | Dec. 5, 1939 |
| 2,392,023 | Cooper | Jan. 1, 1946 |
| 2,441,608 | Warner | May 18, 1948 |
| 2,502,009 | Huyser | Mar. 28, 1950 |